Aug. 9, 1966    M. MARKARIAN    3,266,000
IMPREGNATED TOROIDAL TRANSFORMER HAVING
RADIALLY SPACED WINDINGS
Filed Nov. 29, 1963

INVENTOR
MARK MARKARIAN

BY *Connolly and Hutz*
ATTORNEYS

3,266,000
IMPREGNATED TOROIDAL TRANSFORMER HAVING RADIALLY SPACED WINDINGS
Mark Markarian, Williamstown, Mass., assignor to Sprague Electric Company, North Adams, Mass., a corporation of Massachusetts
Filed Nov. 29, 1963, Ser. No. 327,134
3 Claims. (Cl. 336—229)

The present invention relates to inductance cores of relatively small size, and particularly to fitting these cores with windings. Such cores are in wide use in low energy computer circuits and the like, and because of their small size a multilayer winding operation is awkward to carry out if the winding layers are to be effectively insulated from each other.

Among the objects of the present invention is the provision of novel methods for insulating layers of electrical conductor on inductance cores with less awkwardness, as well as the provision of novel wound cores.

Figure 1:
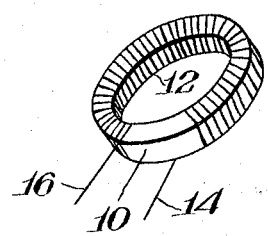
Figure 2:
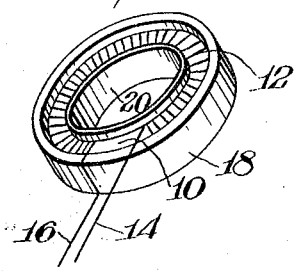
Figure 3:
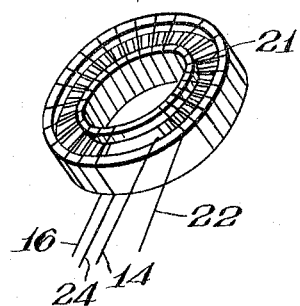
Figure 4:
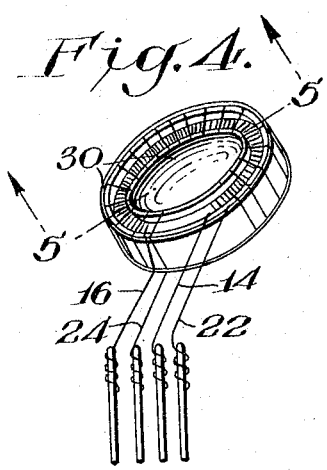
Figure 5:
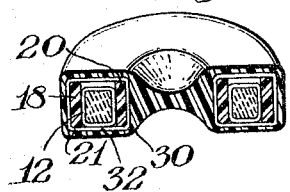
Figure 6:
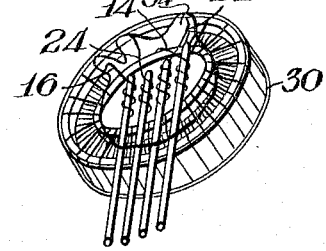
Figure 7:
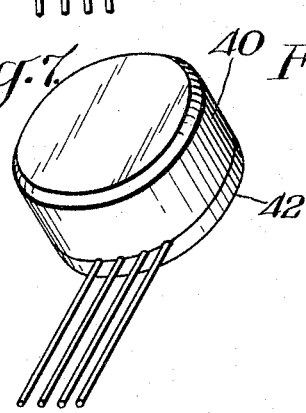
Figure 8:
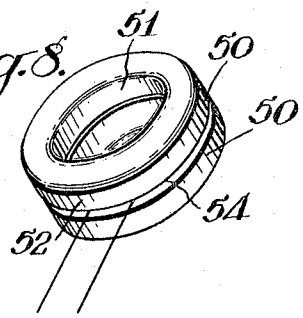

The above as well as additional objects of the present invention will be more fully appreciated from the following description of several of its exemplifications, reference being made to the accompanying drawings wherein:

FIGS. 1 through 7 are views showing successive stages in the winding and assembly of an inductor pursuant to the present invention FIG. 5 being a sectional view taken along the line 5—5 of FIG. 4; and FIG. 8 is a view similar to FIGS. 1 and 2 showing a different manner of winding an inductance core.

According to the present invention a small core such as a toroid having an open center not more than a half inch in width, is provided with a multilayer winding of wire by toroidally winding a layer of wire on the core, placing a first spacer ring around and against the radially outer surface of the wound core, placing a second spacer ring within the open center of and against the radially inner surface of the wound core, each spacer ring having an axial height greater than that of the wound core by an amount sufficient to clear the axial height of the wound surfaces and provide a toroidal assembly, toroidally winding another layer of wire around that assembly, and then impregnating the resulting combination with a dielectric bonding material that anchors the separate windings in place.

This winding method is particularly desirable for the winding of transformers such as pulse transformers with cores that have an open center as small as an eighth of an inch in width or even smaller.

Turning now to the drawings, FIG. 1 shows the core 10 in the form of a toroid with a toroidal winding 12 that can be ordinary magnet wire, the ends 14, 16 of the winding extending out for eventual connection to leads. In the interest of clarity the core is shown greatly enlarged, and a toroid having an overall diameter of 5 millimeters, an internal diameter of 3 millimeters, and a thickness of 1 millimeter is ideally suited for the winding of the present invention.

The winding 12 is in the form of a single layer and after this is completed, outer and inner insulating rings 18, 20 are applied to the wound core. These insulating rings are preferably of such size that they frictionally fit against the wound core and thereby keep themselves in place. A feature of the insulating rings is that they can be readily provided by merely cutting them from elongated tubes of polytetrafluoroethylene, for example. This enables the rings to be supplied in a very simple and inexpensive manner even though a relatively small number of wound cores of any one size are needed. Resins such as polytetrafluoroethylene are sufficiently resilient so that rings cut from a single tube will fit cores of different diameters by stretching or compressing a little. The number of tubes stocked for the above purpose can be further reduced by having them made of shrinkable plastic as by expanding the tubes at relatively low temperature so that when subsequently heated the tubes shrink back toward their original dimension. A single shrinkable tube can in this way be made to provide rings that after heating will fit core diameters that differ by as much as a quarter inch or more.

The rings 18, 20 have axial heights greater than that of the wound core by an amount such that a conductor wound around the ring-carrying core is kept pretty much out of contact with the winding 12. FIG. 3 shows such a second winding 21 toroidally wound around the ring-carrying core, the ends of winding 21 being illustrated at 22, 24 as projecting alongside the ends 14, 16 of winding 12. Only about 10 to 20 thousandths of an inch added height is needed in the rings 18, 20 to adequately space the turns of winding 21 from the turns of winding 12. Lesser differences in height may not be adequate inasmuch as a relatively tight winding of the turns 20 may cause the individual windings to indent their way into the edges of the rings, particularly if the rings have a wall thickness of less than 10 mils. Although less wall thicknesses will provide all the insulation that is needed, it is preferred to have a wall thickness of about 8 to 15 mils, with an excess axial height of about 25 mils.

After the second winding layer is completed, leads are connected to the ends of the windings, FIG. 4, and the wound core is impregnated with a dielectric 30. The impregnant penetrates and fills the spaces between the windings 12 and 21. The impregnant dries or sets to hold all the turns of the windings in place. The impregnant also keeps the turns of one winding from contacting the turns of the other winding except for a few locations as indicated at 32 in FIG. 5, where under the influence of gravity, first winding 12 might come to rest gently touching outer winding 21. It is not necessary to prevent such minor contact because contacts of this type do not significantly detract from the usefulness of the wound assembly. The impregnant is preferably a hydrocarbon polymer such as a butadiene or styrene based polymer. Where the electrical parameters are sensitive to pressures involved in molding, silicones such as silicone rubber are preferred. Polyesters which are solid at room temperature are also suitable for use as impregnants in this invention.

In order to fix the leads in place, they can then be adhered to the core as shown in FIG. 6 as by placing a quantity of adhesive 34 on the face of the wound core and holding one end of each lead in this adhesive until the adhesive sets. An epoxy resin makes a very effective adhesive for the above purpose. Instead of folding the ends 14, 16, 22, 24 back on themselves, they can be wrapped around the core so that they take the position shown in FIG. 6.

The assembly can be used in this form, or it can be further protected as by additional coatings or by encasing the core portion as indicated in FIG. 7. The protection afforded by the impregnant permits the preferred encasement to be attained by transfer molding. Another simple encasement is to provide a casing in split form with a body section 40 and a cover 42, both preforms of thermosetting molding compound. The wound core assembly of FIG. 6 is inserted in body section 40, the cover 42 applied, and molded together under heat and pressure. In another suitable encasement the assembly is placed in a suitable case and encapsulated by potting with epoxy resin.

For simplifying the application of the leads as well as their manipulation through the cementing and encasing operation, these leads can all be held on a suitable carrier such as a single piece of cardboard, and secured thereto as by means of pressure-sensitive tape or the like. For quantity production such a carrier can be made relatively elongated so that it can carry a number of sets of leads suitably spaced from each other so that they can be connected to the winding ends as by soldering while they are so held, and then the remaining manipulation completed on the entire set.

The winding operations themselves can be carried out by hand or by machine without difficulty. With either type of winding the core can be gripped at one location, for example the portion between the winding ends where no winding is to be carried out. Gripping in this way will effectively hold the core of FIG. 1, and will also effectively hold the ring-carrying core of FIG. 2 so that the presence of the rings does not interfere to any appreciable degree with the carrying out of the winding operation. The inner ring 20 does have a significant effect in reducing the size of the opening in the center of the core through which the wire is threaded at every turn of the second winding layer, but notwithstanding such reduction the second layer is readily wound in place. On cores of the relatively small size indicated above, the number of turns of wire needed is quite modest and it is no trouble to carry the necessary length of wire on a winding bobbin as little as a sixteenth of an inch or less in overall thickness.

The spacer rings of the invention provides a wound assembly that has been found to have adequate insulation between the two layers of windings so that they will withstand a potential difference of as much as 200 or more volts between one winding and the other. At the few contacts 32 between the two windings, the insulation on the conductors themselves is adequate to withstand the foregoing potential difference indefinitely. On the other hand the number of defects in the usual wire insulation are generally such that the wrapping of one winding directly around another will usually cause early breakdown because of the extremely large number of contacts between the respective windings. In the prior art the avoidance of such difficulty generally called for the wrapping of insulation around the first winding, and such wrapping is extremely awkward to carry out, particularly with the relatively small size cores.

The separation of the windings from each other can also be carried out by washer-like discs placed against each face of the core after the first winding is applied, but such discs are not convenient to hold in place either for manual or machine winding. Such discs are accordingly not desirable even though they can be made of such size as not to reduce the center opening in the wound assembly.

An alternative more suitable than the washer-like discs is the use of split hollow toroid halves 50, 50 as illustrated in FIG. 8. These shell-like members are readily provided from cold drawable plastic such as polycarbonates. A 5 mil thick sheet of the polycarbonate of bisphenol-A can be readily punched out into the shape of the shells 50, 50 by a simple punch press with the resin unheated. Shells of this type are then conveniently slipped in place over the core after the first winding is applied, and the second winding can be toroidally wound around the assembly. It is not necassary for the shells 50, 50 to butt against each other; so long as their flanges 51, 52 have sufficient height to hold the shells in place against the core, the shells can leave a substantial gap 54 between them without detracting from their effectiveness.

It is preferred to have both the rings and the impregnant of relatively low dielectric constant where the capacitance between windings or between the turns of a winding is to be held to a minimum. A dielectric constant of less than 3 can be obtained with the polytetrafluoroethylene referred to above or with other resins such as polyethylene, polypropylene, polytrifluoromonochloroethylene, as well as from the polyfluorinated ethylenes in which the fluorination is not complete.

The insulation of the present invention can also be used between layers of a single winding where such layers need the extra insulation as by reason of the presence of high voltage between one end of the winding and the other, or because of a low capacitance being called for between the turns.

The cores wound in accordance with the present invention can be of any suitable material, e.g., magnetic ferrites. The ferrites are generaly electrically non-conductive so that they need no pretreatment before receiving the first layer of winding. However, it is preferred to coat ferrite cores with varnish or the like to enhance electrical insulation and to provide a smoother base for the windings. Another class of cores that are highly satisfactory for this invention are the tape-wound bobbin cores. Still other cores may be made of massive iron as well as some made of powdered iron or the like, and should be covered by insulation as by dipping or by use of shells like 50, 50, before the first layer of winding is applied.

Obviously many modifications and variations of the present invention are possible in the light of the above teachings. It is, therefore, to be understood that within the scope of the appended claims the invention may be practiced otherwise than as specifically described.

What is claimed is:

1. A transformer having a toroidal core with an open center not more than about ½ inch in width, a first winding layer toroidally wound on said core, a first spacer ring having a dielectric constant less than 3 around the core and against the radially outer portions of the first winding layer, a second spacer ring having a dielectric constant less than 3 within the open center of the core and against the radially inner portions of the first winding layer, each ring having an axial height greater than that of the first winding layer by an amount sufficient to clear that layer, a second winding layer toroidally wound on the ring-and-core assembly, and a dielectric impregnant between the winding layers and anchoring them in place.

2. A pulse transformer according to claim 1 with the core having its open center not more than about ⅛ inch in width.

3. The combination of claim 2 in which the spacer rings have a dielectric constant of about 2, and the impregnant is silicone rubber.

References Cited by the Examiner

UNITED STATES PATENTS

| | | | |
|---|---|---|---|
| 2,899,631 | 8/1959 | Cushman | 336—96 X |
| 2,961,603 | 11/1960 | MacMillan | 336—229 X |
| 2,997,526 | 8/1961 | Kessel et al. | 336—96 X |
| 3,132,316 | 5/1964 | Elmen et al. | 336—229 X |

LARAMIE E. ASKIN, *Primary Examiner.*

ROBERT K. SCHAEFER, *Examiner.*

W. M. ASBURY, D. J. BADER, *Assistant Examiners.*